Patented Mar. 25, 1952

2,590,433

UNITED STATES PATENT OFFICE 2,590,433

DECHLORINATION OF A HALOCARBON CONTAINING CHLORINE

Oscar A. Blum, Bayonne, N. J., assignor to The M. W. Kellogg Company, Jersey City, N. J., a corporation of Delaware No Drawing. Application May 13, 1949, Serial No. 93,188

10 Claims. (Cl. 260—653)

This invention relates to the dehalogenation of a halogen-containing compound. In one of its more particular aspects this invention relates to the dechlorination of a perhalocarbon. In still another aspect this invention relates to the dechlorination of trichlorotrifluoroethane to produce trifluorochloroethylene.

The dechlorination of chlorine-containing compounds to produce unsaturated compounds is important from the standpoint of producing an intermediate reactant for many processes. For example, the polymerization of unsaturated perhalocarbons yields various useful products, such as plastics and oils. A particularly useful product, polytrifluorochloroethylene, is produced by the polymerization of the monomer trifluorochloroethylene. The monomer is prepared by the dechlorination of trifluorotrichloroethane.

The object of this invention is to provide an improved process for the dechlorination of a perhalocarbon containing chlorine to produce a more unsaturated perhalocarbon.

Another object of this invention is to provide a dechlorination process for dechlorinating perhalocarbons at a lower temperature than heretofore employed.

It is still another object of this invention to provide a method for the dechlorination of trifluorotrichloroethane to produce relatively pure trifluorochloroethylene.

Various other objects and advantages of the present invention will become apparent to those skilled in the art from the accompanying description and disclosure.

As used herein, a "perhalocarbon" is defined as "an acyclic or an alicyclic compound consisting substantially exclusively of carbon and halogen with any degree of saturation and containing less than about 2 weight per cent hydrogen."

According to this invention I have found that a perhalocarbon containing chlorine may be dechlorinated to produce a more unsaturated perhalocarbon by reacting the perhalocarbon with zinc at a temperature below about 75° C. and a corresponding pressure to maintain the perhalocarbon in the liquid phase in the presence of a solvent and a minor proportion of an acid. The zinc reacts with the chlorine of the perhalocarbon to form zinc chloride whereby an unsaturated perhalocarbon is produced. The zinc chloride dissolves in the solvent. Particularly, it has been found that a perfluorochlorocarbon, such as trifluorotrichloroethane, can be dechlorinated to produce a more unsaturated compound at a temperature between about 30 and about 60° C. in the presence of zinc dust and a suitable solvent containing between about 0.01 and about 5 mol per cent of an acid, such as hydrochloric acid, sulfuric acid, acetic acid, hydrofluoric acid, etc. In the case of dechlorination of trifluorotrichloroethane, the product is trifluorochloroethylene which is useful as the monomer for the production of polytrifluorochloroethylene polymers. A superatmospheric pressure sufficient to maintain the perhalocarbons being dechlorinated in the liquid phase is employed.

In some instances, especially when starting the dechlorination reaction, it may be desirable to add zinc chloride as a promoter. However, it has been found that at the elevated temperatures of this process it is not necessary to use zinc chloride even for starting the reaction.

Although water is the preferred solvent for dissolving the zinc halide, other solvents, such as methanol, ethanol, acetone and dioxane, may be used alone or in admixture with water. Water is particularly desirable since it reduces the cost of the solvent, is a relatively inactive impurity, and may be easily separated from the product by distillation, or by allowing the product to settle into two liquid phases comprising an upper perhalocarbon phase and a lower water phase, or by chemical means, e. g., treatment with phosphoric anhydride or calcium chloride.

In general, the solvent contains less than about 5 mol per cent acid, usually less than about one mol per cent acid. Since the organic acids react with organic solvents, such as alcohol, to form esters, it is preferred to employ the inorganic acids with solvents such as alcohol. The organic acids, such as acetic acid, may conveniently be employed when the solvent consists of water. The weight ratio of solvent to perhalocarbon used varies over a wide range; the ratio is preferably greater than about 1:10, and a 1:1 ratio has been found to be satisfactory.

The process may be carried out in either a batch of continuous manner without departing from the scope of this invention. In a batch process the perhalocarbon to be dechlorinated is added continuously to a vessel capable of withstanding superatmospheric pressure which is charged with zinc dust and water. The reactants are maintained at about 60° C. or below and the gaseous product is removed as made. The liquid phase in the vessel is continuously agitated by means of a stirrer. Also as a batch process the reaction may be performed in a high pressure bomb into which the perhalocarbon, zinc dust, and water have been charged. The reactants are heated to about 30 to 60° C., for a sufficient length of time and the gaseous products removed at the completion of the reaction. The liquid phase in the bomb is continuously agitated by means of shaking the bomb. In a continuous process the perhalocarbon to be dechlorinated and a slurry of zinc dust in water are continuously charged to a reaction zone, such as a stirred reactor, in which the temperature of the reactants is maintained at the desired level and under a corresponding pressure sufficient to maintain the perhalocarbon in the liquid phase. Upon dechlorination of the perhalocarbon, the more unsaturated perhalocarbon formed may be continuously removed as a vapor by maintaining temperature and pressure conditions corresponding to about or above the boiling point of the perhalocarbon product. The unsaturated perhalocarbon vapors are continuously withdrawn, condensed, and passed to a suitable distillation equipment and dryers for removal of entrained or accompanying solvent and perhalocarbon feed. It is within the scope of this invention to operate the continuous process completely in the liquid phase in which the more unsaturated perhalocarbon product is also maintained in the liquid phase. In such modification of the present invention a liquid effluent is continuously withdrawn from the reaction zone and subjected to a distillation for removal of the perhalocarbon product from the perhalocarbon feed and solvent.

The use of elevated temperatures and pressures according to this invention is particularly desirable and advantageous since, as in the case of the production of trifluorochloroethylene, the overhead vapors from the reaction zone may be condensed by means of tap water when the overhead or vaporous effluent is maintained under operating pressures. The use of tap water for condensing the overhead and cooling the reaction effluent materially decreases the cost of operation.

The following example is offered as a better understanding of the present invention and should not be construed as unnecessarily limiting to the invention. The example relates to the dechlorination of trifluorotrichloroethane to trifluorochloroethylene in the presence of zinc dust, but the invention may be applied to the dechlorination of other perfluorochlorocarbons to produce other more unsaturated perhalocarbons.

The following materials were employed to dechlorinate trifluorotrichloroethane (Freon 113) to produce a high yield of trifluorochloroethylene:

Materials 188 gms. of $CF_2ClCFCl_2$ (F-113)
163 gms. of zinc
375 ml. comm. anhydrous methanol
130 ml. conc. HCl The F-113 and methanol were weighed into 2-liter 3-necked flask equipped with a stirrer and reflux condenser and 40 ml. of conc. hydrochloric acid added. Zinc dust, 5 gms., was added with stirring and the temperature increased to 45° C. Numerous bubbles were observed which may have been a mixture of hydrogen and trifluorochloroethylene. Zinc and hydrochloric acid were added intermittently throughout the run over a period of 3 hours until the addition amounted to 163 gms. of zinc and 130 ml. of conc. HCl. All the F-113 was dechlorinated. The vapors condensable at Dry Ice temperature proved to be substantially pure trifluorochloroethylene.

Using methanol or ethanol and zinc dust without the addition of acid ordinarily requires a temperature of at least about 75° C. to produce trifluorochloroethylene at an equal or slower rate.

Having described my invention, I claim:

1. The improved process for the dechlorination of a perhalocarbon containing chlorine which comprises reacting a metal with a perhalocarbon containing chlorine at a temperature lower than about 75° C. and a corresponding pressure sufficient to maintain said perhalocarbon in the liquid phase in the presence of an acidified solvent containing between about 0.01 and about 5 mol per cent of an acid to produce a more unsaturated perhalocarbon as the product of the process.

2. The process of claim 1 in which said metal is zinc.

3. The process for the dechlorination of a perhalogencarbon according to claim 1 in which said acid is an inorganic acid.

4. The process of claim 1 in which said solvent is anhydrous methanol and said acid is hydrochloric acid.

5. The process for the dechlorination of a perhalocarbon according to claim 1 in which said solvent comprises water in admixture with methanol.

6. The process for the dechlorination of a perhalocarbon according to claim 1 in which said acid is sulfuric acid.

7. The process according to claim 1 in which said acid is acetic acid.

8. The improved process for the dechlorination of a trifluorotrichloroethane which comprises reacting finely divided zinc with trifluorotrichloroethane at a temperature lower than about 75° C. and a corresponding pressure sufficient to maintain trifluorotrichloroethane in the liquid phase in the presence of an acidified solvent consisting essentially of water containing between about 0.01 and about 5 mol per cent of an inorganic acid to produce trifluorochloroethylene.

9. The improved process for the dechlorination of 1,1,2-trifluorotrichloroethane which comprises reacting finely divided zinc with 1,1,2-trifluorotrichloroethane at a temperature between about 30° C. and about 60° C. and a corresponding pressure sufficient to maintain the trifluorotrichloroethane in the liquid phase in the presence of an acidified solvent containing between about 0.01 and about 5 mol per cent of an inorganic acid to produce trifluorochloroethylene.

10. The improved process for the dechlorination of 1,1,2-trifluorotrichloroethane which comprises reacting finely-divided zinc with 1,1,2-trifluorotrichloroethane at a temperature between about 30° C. and about 60° C. and a corresponding pressure sufficient to maintain the trifluorotrichloroethane in the liquid phase in the presence of acidified aqueous methanol containing between about 0.01 and about 5 mol per cent of hydrochloric acid to produce trifluorochloroethylene.

OSCAR A. BLUM.

REFERENCES CITED

The following references are of record in the file of this patent:

UNITED STATES PATENTS

| Number | Name | Date |
|---|---|---|
| 2,401,897 | Benning et al. | June 11, 1946 |